United States Patent
Park

(10) Patent No.: US 10,671,716 B2
(45) Date of Patent: Jun. 2, 2020

(54) USER AUTHENTICATION METHOD AND SYSTEM USING VARIABLE KEYPAD AND BIOMETRIC IDENTIFICATION

(71) Applicant: HAREXINFOTECH INC., Seoul (KR)

(72) Inventor: Kyung Yang Park, Seoul (KR)

(73) Assignee: HAREXINFOTECH INC., Seoul (KR)

( * ) Notice: Subject to any disclaimer, the term of this patent is extended or adjusted under 35 U.S.C. 154(b) by 0 days.

(21) Appl. No.: 16/405,016

(22) Filed: May 7, 2019

(65) Prior Publication Data

US 2019/0258795 A1 Aug. 22, 2019

Related U.S. Application Data

(62) Division of application No. 15/322,333, filed as application No. PCT/KR2015/006590 on Jun. 26, 2015, now Pat. No. 10,331,868.

(30) Foreign Application Priority Data

Jun. 26, 2014 (KR) .................. 10-2014-0079247

(51) Int. Cl.
  *G06F 21/00* (2013.01)
  *G06F 21/32* (2013.01)
  (Continued)

(52) U.S. Cl.
  CPC .......... *G06F 21/32* (2013.01); *G06F 3/04886* (2013.01); *G06F 21/36* (2013.01);
  (Continued)

(58) Field of Classification Search
  None
  See application file for complete search history.

(56) References Cited

U.S. PATENT DOCUMENTS

| 8,484,480 B2 | 7/2013 | Cheng et al. |
| 9,552,465 B2 | 1/2017 | Pike |

(Continued)

FOREIGN PATENT DOCUMENTS

| CN | 103237030 A | 8/2013 |
| JP | 2006-200387 A | 8/2006 |

(Continued)

OTHER PUBLICATIONS

The State Intellectual Property Office of the P.R. of China Communication dated May 29, 2019, issued in Application No. 201580042183.6.

(Continued)

*Primary Examiner* — Andrew J Steinle
(74) *Attorney, Agent, or Firm* — Sughrue Mion, PLLC

(57) ABSTRACT

The present invention relates to a user authentication server which mixedly uses both a password and biometric information. The user authentication server comprise: a variable keypad generation unit for generating a variable keypad including password keys and a biometric authentication key, wherein the position of each password key and the position of the biometric authentication key are changed in each generation of the keypad; an authentication information storage unit for storing authentication information of portable terminal users; and an authentication unit for authenticating a user by remotely providing information of generated variable keypad to a portable terminal, and comparing biometric information and information of the positions of the password keys in accordance with the order of input by the user, received from the portable terminal, with the authentication information stored in the authentication information storage unit.

3 Claims, 12 Drawing Sheets

(51) Int. Cl.
  *H04L 29/06*     (2006.01)
  *H04W 12/06*    (2009.01)
  *H04W 88/02*    (2009.01)
  *H04M 1/673*    (2006.01)
  *G06F 3/0488*   (2013.01)
  *G06F 21/36*    (2013.01)
  *G06F 21/45*    (2013.01)

(52) U.S. Cl.
  CPC ............ *G06F 21/45* (2013.01); *H04L 63/083* (2013.01); *H04L 63/0861* (2013.01); *H04M 1/673* (2013.01); *H04W 12/06* (2013.01); *H04W 88/02* (2013.01); *H04L 2463/082* (2013.01)

(56)        References Cited

U.S. PATENT DOCUMENTS

| 2003/0182558 | A1* | 9/2003  | Lazzaro ............ G06Q 30/0641 |
|              |     |         |                       713/183    |
| 2007/0021194 | A1* | 1/2007  | Aida ................. G07F 17/3206 |
|              |     |         |                        463/29    |
| 2008/0081702 | A1  | 4/2008  | Tanaka et al. |
| 2010/0145592 | A1  | 6/2010  | Yoo |
| 2011/0191591 | A1  | 8/2011  | Cheng et al. |
| 2012/0140993 | A1  | 6/2012  | Bruso et al. |
| 2012/0293642 | A1* | 11/2012 | Berini ................ G06F 21/32 |
|              |     |         |                         348/77   |
| 2013/0047237 | A1  | 2/2013  | Ahn et al. |
| 2015/0154414 | A1  | 6/2015  | Pike |
| 2016/0224771 | A1  | 8/2016  | Pike |
| 2016/0314293 | A1  | 10/2016 | Pike |

FOREIGN PATENT DOCUMENTS

| JP | 2007-011420 A | 1/2007 |
| JP | 2007-247430 A | 9/2007 |
| JP | 2008-57370 A | 3/2008 |
| JP | 2012-059084 A | 3/2012 |
| KR | 10-2008-0036446 A | 4/2008 |
| KR | 10-0828558 B1 | 5/2008 |
| KR | 10-2010-0064919 A | 6/2010 |
| KR | 10-2011-0119521 A | 11/2011 |
| KR | 10-2013-0042802 A | 4/2013 |
| KR | 10-2014-0075855 A | 6/2014 |
| WO | 2010/005960 A1 | 1/2010 |
| WO | 2014/013252 A2 | 1/2014 |

OTHER PUBLICATIONS

Communication dated Sep. 13, 2017 from the Australian Patent Office in counterpart Australian application No. 2015280802.
European Patent Office; Communication dated Jan. 30, 2018 in counterpart application No. 15811063.5.
Japanese Patent Office; Communication dated Feb. 2, 2018 in counterpart application No. 2017-520845.
International Search Report for PCT/KR2015/006590 dated Sep. 15, 2015 [PCT/ISA/210].
Written Opinion for PCT/KR2015/006590 dated Sep. 15, 2015 [PCT/ISA/210].

* cited by examiner

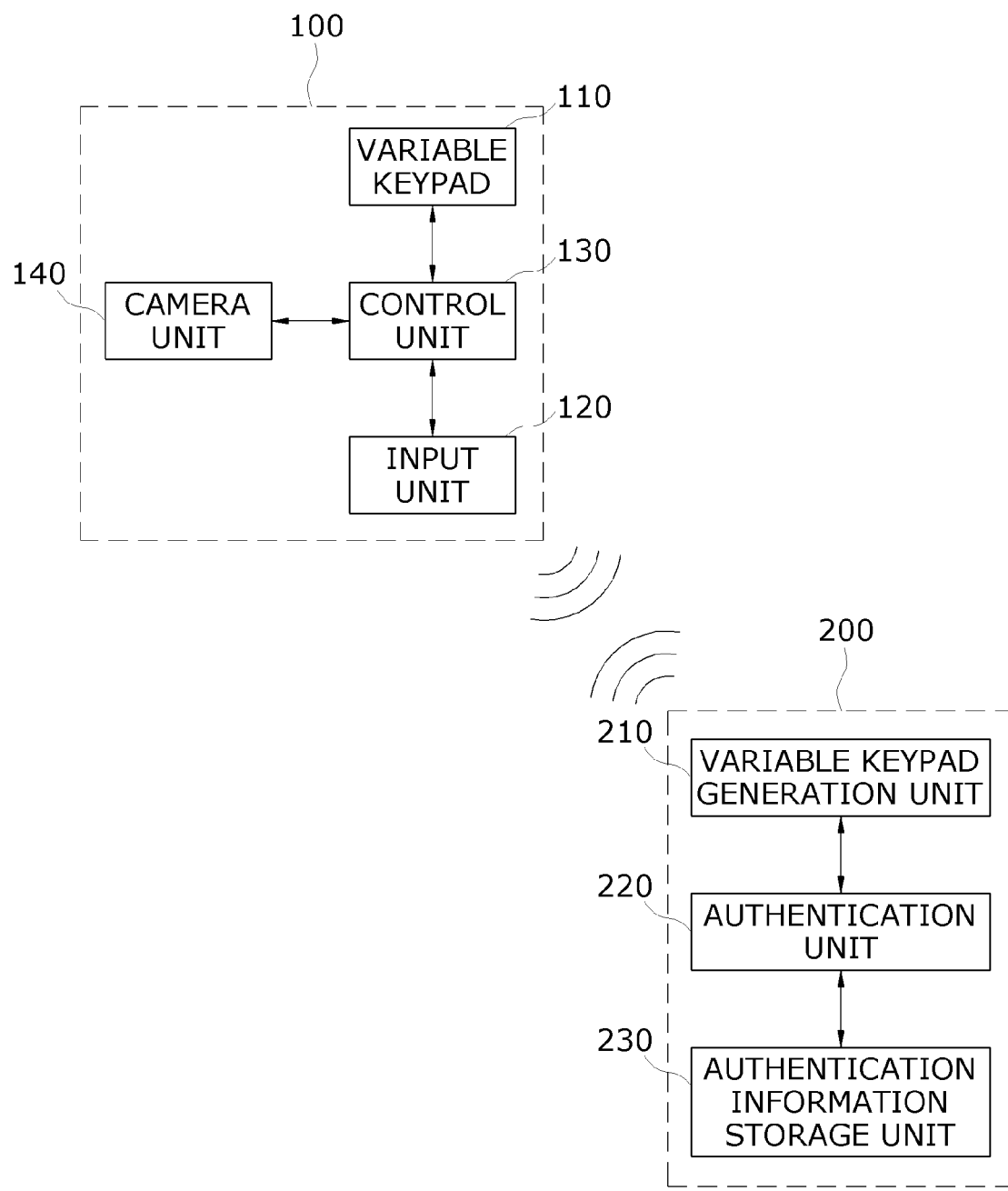

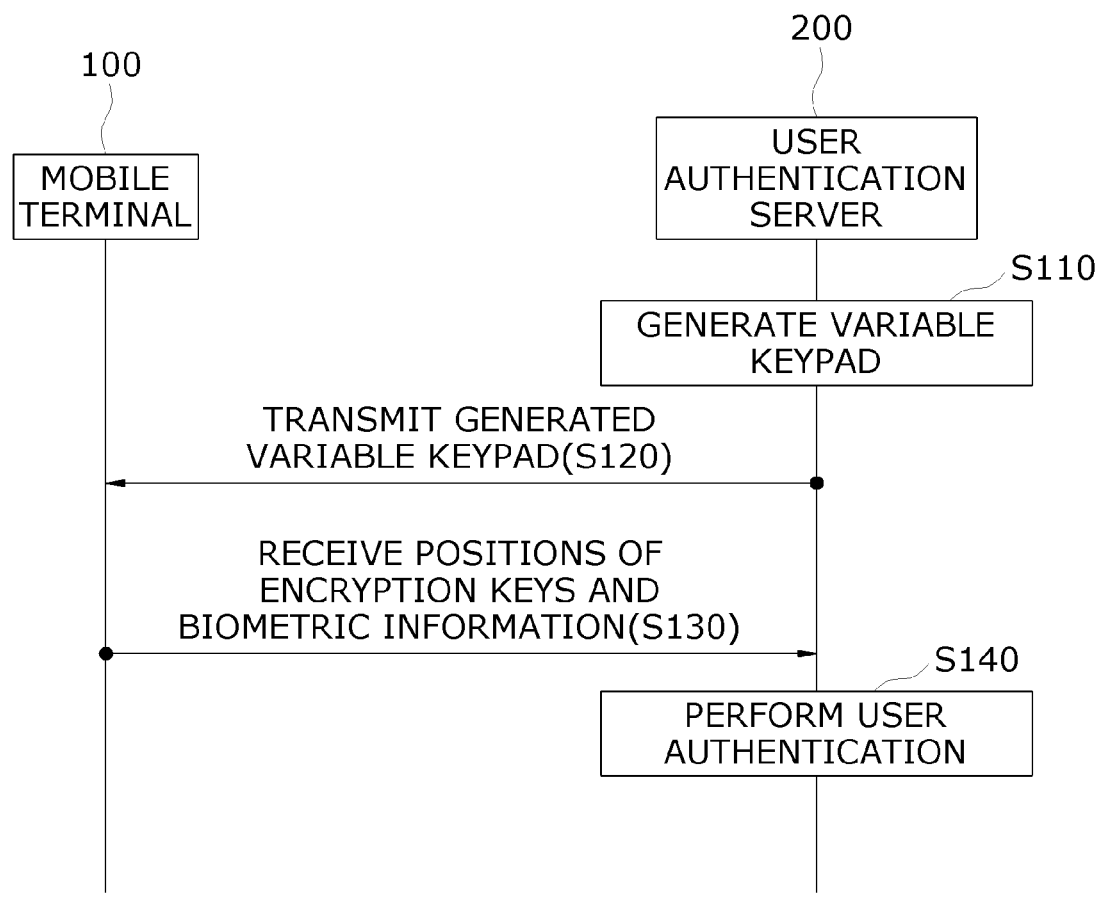

FIG. 3A

FIRST TIME

|   | 1 | 2 | 3 |
|---|---|---|---|
| 4 | Bio | 5 | 6 |
| * | 7 | 8 | # |
| 9 | CANCEL | CORRECT | 0 |

FIG. 3B

| | | | | SECOND TIME |
|---|---|---|---|---|
| * | 6 | 7 | 8 | |
| 9 | | 0 | # | |
| CORRECT | 1 | Bio | 2 | |
| 3 | CANCEL | 4 | 5 | |

USER AUTHENTICATION METHOD AND SYSTEM USING VARIABLE KEYPAD AND BIOMETRIC IDENTIFICATION

CROSS REFERENCE TO RELATED APPLICATIONS

This application is a Divisional of U.S. application Ser. No. 15/322,333 filed Dec. 27, 2016, which is a National Stage of International Application No. PCT/KR2015/006590, filed on Jun. 26, 2015, which claims priority from Korean Patent Application No. 10-2014-0079247, filed on Jun. 26, 2014, the contents of all of which are herein incorporated by reference in their entireties.

TECHNICAL FIELD

The present invention relate to a method and system for user authentication, and more particularly, to a user authentication method and system that receives biometric information and password position information corresponding to a password input order through a variable keypad, transmits the biometric information and the password position information to a server, and performs user authentication at the server.

BACKGROUND ART

In a modern society, a password needs to be entered for an electronic settlement based on a smartphone. Unlike cell phones, smartphones are vulnerable to hacking like general-purpose personal computers (PCs) because applications for smartphones can be developed by anyone.

In particular, when a password is entered through a fixed keypad, password touch coordinates of a user may be revealed. In this case, the password itself may be leaked, so the user needs to pay special attention.

In order to solve such a problem, an authentication method using a variable keypad was developed. In the variable keypad method, positions of input buttons of a keypad are changed every time a user performs a connection. Accordingly, the possibility that a password will be leaked is small, even when positions of input buttons of a keypad of a smartphone are stolen by a third party.

A user cannot perform authentication when the user does not know the password itself.

However, in a variable-keypad-based authentication method, the password itself is transmitted from a terminal to a server when authentication is requested. Accordingly, when a hacker hacks a password while the password is being transmitted, the hacker can find out the password itself, and this causes leakage of personal information and vulnerability in security.

Also, when a third party that knows the password of a user itself pretends to be the user and performs user authentication, the authentication cannot be prevented from being successful.

DETAILED DESCRIPTION OF THE INVENTION

Technical Problem

The present invention is intended to solve the above problems and is directed to providing a user authentication method and system that prevent password leakage and improve security by transmitting password position information from a mobile terminal to a user authentication server.

Further, the present invention is directed to providing a user authentication method and system that further increase security by adding biometric information to an authenticator.

Technical Solution

According to an aspect of the present invention, a user authentication server that uses both a password and biometric information includes a variable keypad generation unit configured to generate a variable keypad including password keys and a biometric authentication key, wherein positions of the password keys and biometric authentication key are changed every time the keypad is generated; an authentication information storage unit configured to store a password and authentication information of mobile terminal users; and an authentication unit configured to perform user authentication by providing the generated variable keypad to a mobile terminal located in a remote position and receiving biometric information and position information of the password keys corresponding to order in which the password keys are input from the mobile terminal.

According to another aspect of the present invention, a mobile terminal capable of user authentication includes a display unit configured to display a variable keypad, wherein positions of password keys and biometric authentication key are changed every time the variable keypad is generated; and a control unit configured to receive the variable keypad from a user authentication server and deliver position information of password keys, order in which the password keys are input, and biometric information to the user authentication server through the variable keypad.

According to still another aspect of the present invention, a method of performing user authentication using both a password and biometric information by a user authentication server includes generating a variable keypad including password keys and a biometric authentication key, wherein positions of the password keys and the biometric authentication key are changed every time the keypad is generated; transmitting the generated variable keypad to a mobile terminal; receiving biometric information and position information of the password keys corresponding to order in which the password keys are input by a user from the mobile terminal; and performing user authentication based on the received biometric information and position information of the password keys.

Advantageous Effects of the Invention

According to the present invention, a password itself that is input through a variable keypad is not transmitted to a user authentication server, but position information of the password corresponding to order in which the password is input by a user is transmitted. Accordingly, it is possible to improve security because a hacker cannot become aware of the password even though the hacker intercepts position information of the secret information that is being transmitted from a terminal to a server.

Also, compared to a related art in which four digits of a password are just input and then changed in position, it is possible to further improve security because user authentication is performed through a password and biometric information.

Subsequently, when the biometric information is iris information, it is possible to prevent theft or counterfeiting because an iris has individual characteristics for each person and further improve security in connection with a password because the iris is more complex and delicate than a fingerprint.

DESCRIPTION OF THE DRAWINGS

FIG. 1 is a block diagram showing a user authentication system that uses both a password and biometric information according to an embodiment of the present invention.

FIG. 2 is a sequence diagram showing a user authentication method that uses both a password and biometric information according to an embodiment of the present invention.

FIG. 3A is a diagram showing a variable keypad that is generated first as an example of a variable keypad including password keys and a biometric authentication key that is generated such that positions of the password keys and the biometric authentication key are changed every time the variable keypad is generated according to an embodiment of the present invention.

FIG. 3B is a diagram showing a variable keypad that is generated second as an example of a variable keypad including password keys and a biometric authentication key that is generated such that positions of the password keys and the biometric authentication key are changed every time the variable keypad is generated according to an embodiment of the present invention.

BEST MODE

Figure 4A:
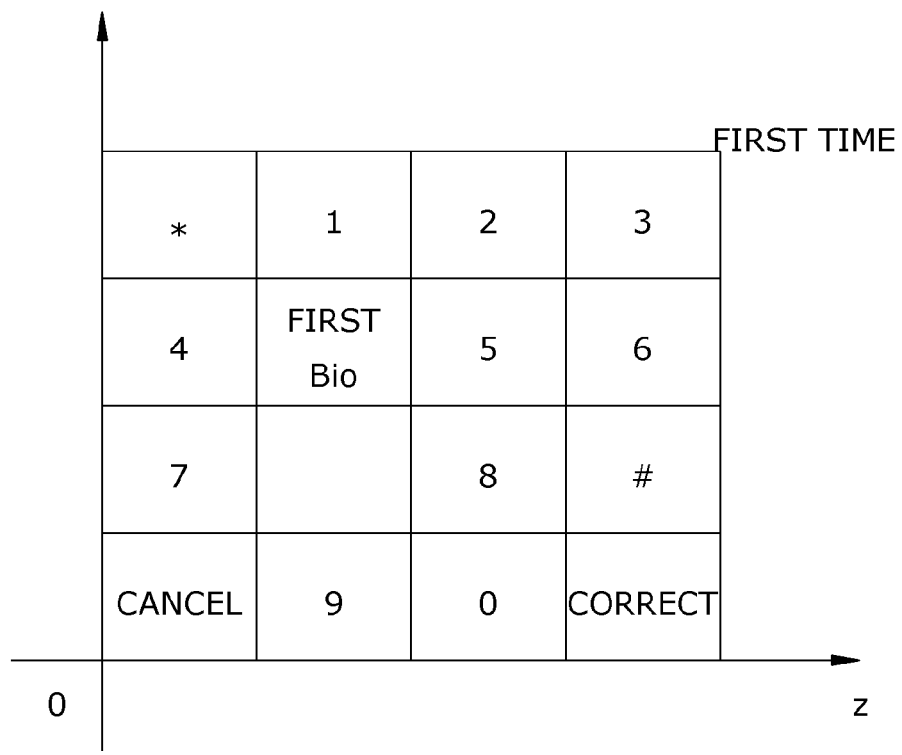
FIG. 4A is a diagram showing a variable keypad in an x-y plane according to an embodiment of the present invention.

These and other objects, advantages and features of the present invention, and implementation methods thereof will be clarified through following embodiments described with reference to the accompanying drawings.

The present invention may, however, be embodied in different forms and should not be construed as being limited to the embodiments set forth herein. Rather, these embodiments are provided so that this disclosure will fully convey the objects, configurations, and effects of the present invention to those skilled in the art. The scope of the present invention is defined solely by the appended claims.

The terminology used herein is for the purpose of describing embodiments only and is not intended to limit the present invention. As used herein, the singular forms "a," "an" and "the" are intended to include the plural forms as well, unless the context clearly indicates otherwise. The terms "comprises" and/or "comprising," when used in this specification, specify the presence of stated elements, steps, operations, and/or components, but do not preclude the presence or addition of one or more other elements, steps, operations, and/or components.

Hereinafter, embodiments of the present invention will be described in detail with reference to the accompanying drawings.

FIG. 1 is a block diagram showing a user authentication system that uses both a password and biometric information according to an embodiment of the present invention.

As shown in FIG. 1, a user authentication server 200 that uses a password and biometric information includes a variable keypad generation unit 210, an authentication unit 220, and an authentication information storage unit 230.

The variable keypad generation unit 210 generates a variable keypad including password keys and a biometric authentication key. In this case, positions of the password keys and the biometric authentication key are changed every time the variable keypad is generated.

The authentication unit 220 provides information regarding the generated variable keypad (that is, key button arrangement information) to a mobile terminal 100 that is located at a remote position.

As another example, a method of generating a plurality of variable keypads in advance, assigning an identifier to each of the variable keypads, sharing the identifier with a mobile terminal, and transmitting only the identifier of the variable keypad as variable keypad information every time authentication takes place may be applied.

The authentication unit 220 receives biometric information and position information of password keys corresponding to order in which the password keys are input by a user from a mobile terminal 100 and performs user authentication based on the received biometric information and position information.

For example, the authentication unit 220 receives biometric information and position information of password keys corresponding to order in which the password keys are input by a user (referring to FIG. 4A, 4, 3, 1, and 2 on the keypad corresponding to (0.5, 2.5), (3.5, 3.5), (1.5, 3.5), and (2.5, 3.5)) from a mobile terminal (e.g., a smartphone) and performs user authentication based on the received biometric information and position information.

The authentication unit 220 stores position information and input order of password keys corresponding to a password every time a variable keypad is generated. When the authentication unit 220 receives biometric information and position information of password keys corresponding to order in which the password keys are input by a user from the mobile terminal 100, the authentication unit 220 performs user authentication by comparing the received biometric information, position information, and input order with position information of password keys, input order of password keys, and biometric information of users that are prestored.

For example, referring to FIG. 4A, when a password is 4312, position information of the password (i.e., password keys) corresponds to (0.5, 2.5), (3.5, 3.5), (1.5, 3.5), and (2.5, 3.5), and input order of the password is the same as that described above.

In this case, as an additional embodiment, the authentication unit 220 may receive biometric information (e.g., fingerprint information) recognized in an area (1.5, 2.5) of a biometric authentication key in addition to its position information and may perform user authentication on the basis of the information.

The authentication unit 220 stores the above-described information for authentication in the authentication information storage unit every time a variable keypad is generated and provides the authentication information to the mobile terminal 100.

The position information of the password corresponding to the order in which the password keys are input by the user, which is received by the authentication unit 220 from the mobile terminal 100, corresponds to (0.5, 2.5), (3.5, 3.5), (1.5, 3.5), and (2.5, 3.5). Also, when position information of a password, its input order, and fingerprint information are received from the mobile terminal 100, the authentication unit 220 may perform authentication by comparing the received position information, input order, and fingerprint information with authentication information including the position information (0.5, 2.5), (3.5, 3.5), (1.5, 3.5), and (2.5, 3.5), the input order, and the fingerprint information of the user that are stored in the authentication information storage unit 230.

According to an embodiment of the present invention, a fingerprint, an iris, voice, blood vessels (vein), or the like may be used as the biometric information.

When the biometric information is a fingerprint, the authentication unit 220 compares points of feature points of a fingerprint received from the mobile terminal 100 with positions of feature points of a fingerprint stored in the authentication information storage unit 230, compiles statistics from the comparison, calculates a score using the statistics, and determines that the fingerprints are the same when the calculated score is greater than or equal to a predetermined threshold value (e.g., 80%).

Fingerprint recognition technology is a technology for emitting light to a fingerprint and recognizing and reading ridges of the fingerprint using the reflected light. This technology is widely utilized because quick scanning is performed when a user puts his or her finger on a surface of a scanner.

Fingerprint recognition technology is a technology for identifying individuals by finding a unique fingerprint pattern for each person, scanning bifurcations, ridge lengths, and ridge endings to obtain features for each fingerprint in the form of coordinates, and comparing the coordinates with the prestored data.

An input apparatus for fingerprint recognition is classified into an optical type in which a prism, hologram, or the like is used and a non-optical type in which heat or pressure of a finger or electric field or ultrasonic waves are detected.

Compared to other biometric recognition technologies, fingerprint recognition technology has advantages in that a sensor and a semiconductor that are used to store and identify fingerprints are inexpensive, development of the technology is relatively fast, and the technology is applicable to various applications.

Fingerprint recognition has advantages of having a relatively high recognition rate (that is, an error rate of 0.5% or less) and a fast verification speed of 1 second or less. Also, fingerprint recognition has advantages in terms of adoptability, convenience, and reliability.

Also, when fingerprint recognition is used, users feel less burdened in comparison to any other biometric recognition technologies. Also, an apparatus for fingerprint recognition occupies a very small space.

When the biometric information is voice, the authentication unit 220 extracts a characteristic from voice received from the mobile terminal 100 to generate a reference pattern, compares the generated reference pattern with a reference pattern stored in the authentication information storage unit 230 to measure similarity therebetween, and determines that the received voice is the same as that stored in the authentication information storage unit 230 when the measured similarity is greater than or equal to a predetermined threshold value (e.g., 80%).

Voice recognition technology recognizes information through a unique voice pattern of each person. Voice recognition technology removes noise, finds a unique vocal range of each person, and identifies individuals on the basis of the unique vocal range.

Accordingly, in order to initially utilize voice recognition technology, voice necessarily needs to be recorded while there is almost no ambient noise.

When the biometric information is acquired using a vein recognition technology, the authentication unit 220 scans blood vessels in the back of a hand to obtain a position of a less deformed blood vessel as specific coordinates and performs recognition. Vein recognition technology is a technology that was developed in South Korea. Vein recognition technology uses a principle in which when infrared light is emitted to a finger, the infrared light cannot pass through red blood cells, and thus only blood vessels are imaged as dark regions by a camera.

Vein recognition technology has a great advantage in that infrared light utilized in this technology is harmless to humans. That is, vein recognition technology is a technology for finding the number and angles of venous branches that are entangled like highways and quickly reading the venous branches.

Other biometric information includes a face, a palm print, hand geometry, a thermal image, a signature, a vein, typing keystroke dynamics, and retina.

The authentication information storage unit 230 stores passwords and biometric information of mobile terminal users.

Also, the authentication information storage unit 230 stores authentication information including password keys (passwords) of variable keypads generated by the variable keypad generation unit 210, position information of the password keys, and biometric information.

The mobile terminal 100 includes a variable keypad 110, a display unit 120, a control unit 130, and a camera unit 140.

Here, the mobile terminal 100 includes a smartphone, a cell phone, a tablet PC, a notebook, a mobile credit card payment terminal, an automatic teller machine (ATM) of a bank, a kiosk installed in a pharmacy, a government office, etc., or the like.

The variable keypad 110 is generated such that positions of password keys and a biometric authentication key input from a user are changed every time the variable keypad 110 is generated. That is, originally, the variable keypad generation unit 210 of the user authentication server 200 generates a variable keypad, and the variable keypad 110 of the mobile terminal 100 serves to show the generated variable keypad to a user on the basis of information on the keypad generated by the user authentication server 200.

The display unit 120 displays information on the variable keypad 110 that is generated such that positions of password keys and a biometric authentication key are changed every time the variable keypad 110 is generated.

The control unit 130 receives the information on the variable keypad from the user authentication server 200 and transmits position information of password keys, order in which the password keys are input, and biometric information, all of which are acquired, to the user authentication server 200.

The camera unit 140 captures an image of the front of a user. Here, the camera unit 140 is equipped with an iris recognition system and may include a function of transforming a complex iris pattern into a series of digital codes by using a mathematical technique called "wavelet transformation."

FIG. 2 is a sequence diagram showing a user authentication method that uses both a password and biometric information according to an embodiment of the present invention.

As shown in FIG. 2, first, the method includes generating a variable keypad including password keys and a biometric authentication key (S110). In this case, positions of the password keys and the biometric authentication key are changed every time the variable keypad is generated.

Next, the method includes transmitting the generated variable keypad to a mobile terminal (S120).

Subsequently, the method includes receiving biometric information and position information of the password keys corresponding to order in which the password keys are input by a user from the mobile terminal 100 (S130).

Last, the method includes performing user authentication on the basis of the received biometric information and position information corresponding to the input order (S140).

According to an embodiment of the present invention, position information of some of the password keys may be used when the user authentication is performed.

For example, when a password is 4312, a user does not need to input all four digits of the password and may input the first two digits 4 and 3, the last two digits 1 and 2, or the first and third digits.

When the first two digits 4 and 3 are input, positions of the password are (0.5, 2.5) and (3.5, 3.5), as shown in FIG. 4.

Accordingly, the user authentication is performed on the basis of positions (0.5, 2.5) and (3.5, 3.5) of the password, its input order, and biometric information (e.g., fingerprint information, iris information, etc.).

When user authentication is performed on the basis of position information of some password keys, it is possible to increase calculation speed because the amount of data required to perform the authentication is smaller than that of position information of all password keys, and also it is possible to improve user convenience because the number of password keys that should be input is smaller than the entire number of password keys.

FIGS. 3A and 3B are diagrams showing a variable keypad that is generated first and a variable keypad that is generated second, respectively, as an example of a variable keypad including password keys and a biometric authentication key that is generated such that positions of the password keys and the biometric authentication key are changed every time the variable keypad is generated according to an embodiment of the present invention.

As shown in FIGS. 3A and 3B, positions of password keys and biometric authentication key Bio on a variable keypad are changed every time the variable keypad is generated.

Figure 4B:
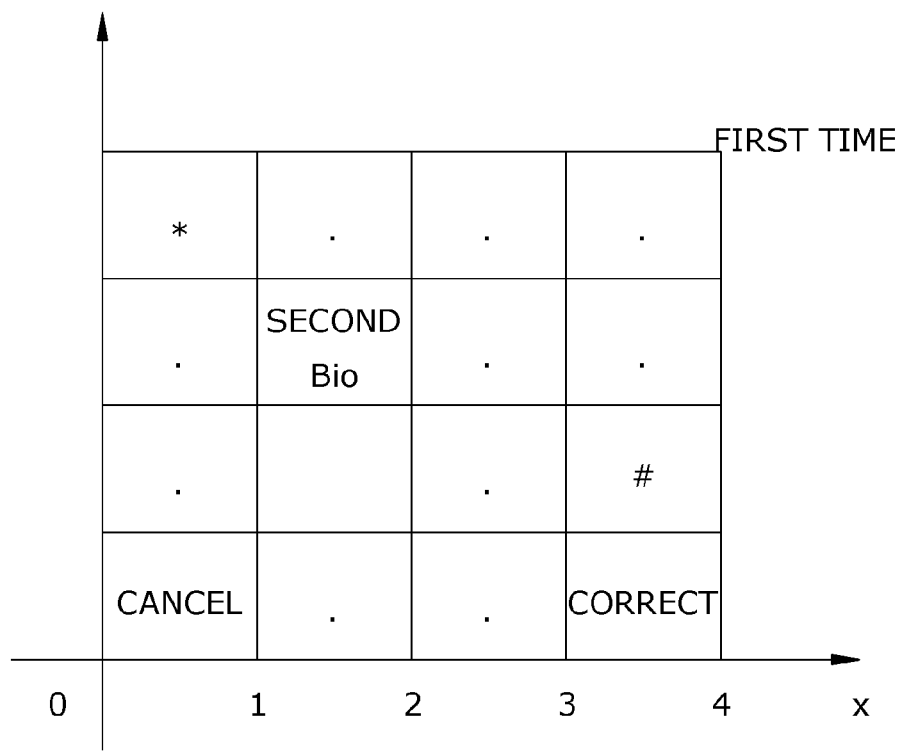
FIG. 4B is a diagram showing position information of a variable keypad in an x-y plane according to an embodiment of the present invention.

FIGS. 4A and 4B are diagrams showing a variable keypad in an x-y plane according to an embodiment of the present invention, and FIG. 4B is a diagram showing position information of a variable keypad in an x-y plane according to an embodiment of the present invention.

As shown in FIG. 4A, a user enters a password (e.g., 4312) and presses a biometric information input button Bio through a mobile terminal 100.

For example, position information of the password may be set as a coordinate value in an x-y plane. Also, the position information of the password may be set as a coordinate value of a pixel. This is merely an example, and the position information of the password can be transformed into another format.

Position information corresponding to the password of 4312 includes (0.5, 2.5), (3.5, 3.5), (1.5, 3.5), and (2.5, 3.5), and order of the position information such as password input order from 4 to 3 to 1 to 2 also has a significant meaning.

When a user presses the biometric information input button Bio, a fingerprint input scanning sensor is activated at a position where the input button is pressed and acquires a fingerprint image of the user.

According to another embodiment, when a user presses the biometric information input button Bio, a fingerprint input window is shown in the form of a pop-up window. The fingerprint input window has a size of 2.5 cm×2.5 cm. The size is enough to acquire fingerprints of fingers other than the index finger.

The fingerprint input window is in the form of a touch screen. When a predetermined time passes after a user touches his or her finger, the fingerprint input scanning sensor is automatically activated, and thus the fingerprint input window acquires a fingerprint image of the user.

Figure 5:
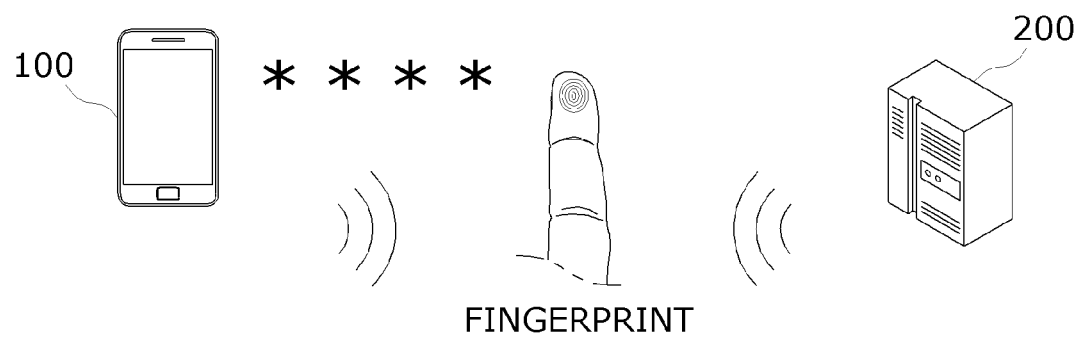
FIG. 5 is a diagram showing an example of transmitting password position information and biometric information from a mobile terminal to a user authentication server according to an embodiment of the present invention.

FIG. 5 is a diagram showing an example of transmitting password position information and biometric information from a mobile terminal to a user authentication server.

As shown in FIG. 5, a mobile terminal 100 transmits position information of a password, input order thereof, and biometric information (e.g., (0.5, 2.5), (3.5, 3.5), (1.5, 3.5), (2.5, 3.5), input order of the position information, and fingerprint information) to a user authentication server 200.

Figure 6:
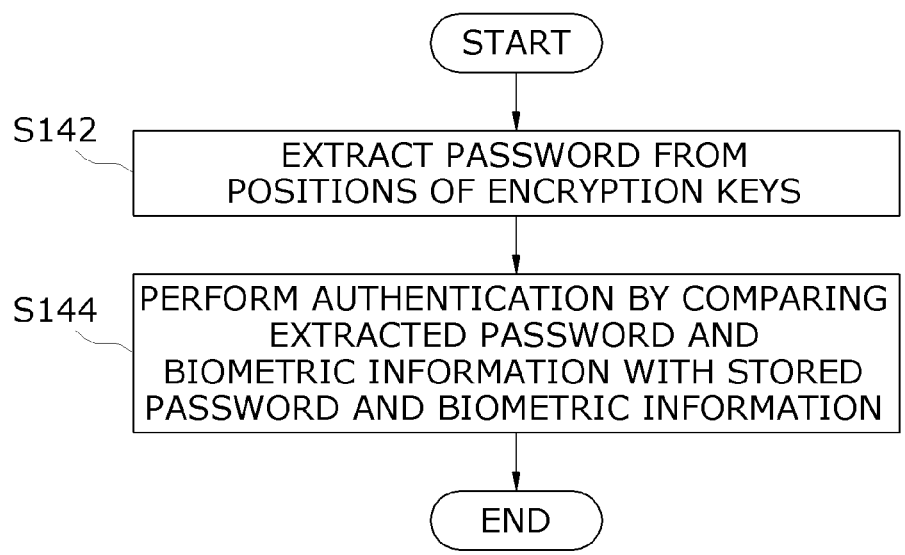
FIG. 6 is a flowchart showing an example of extracting a password from positions of password keys and performing user authentication according to an embodiment of the present invention.

FIG. 6 is a flowchart showing an example of extracting a password from positions of password keys and perform user authentication according to an embodiment of the present invention.

That is, this case assumes that the password is prestored in the user authentication server 200. Use authentication is performed by receiving position information of a password from the mobile terminal 100, extracting the password from the received position information and input order thereof, and comparing the extracted password with the password stored in the authentication information storage unit 230.

As shown in FIG. 6, the authentication unit 220 receives positions (e.g., (0.5, 2.5), (3.5, 3.5), (1.5, 3.5), (2.5, 3.5) and input order of the position information) of password keys corresponding to order in which the password keys are input by a member from the mobile terminal 100 and extract a password (e.g., 4312) input by the member (S142).

The authentication unit 220 perform authentication by comparing the extracted password (e.g., 412) and received biometric information (e.g., fingerprint information, iris information or the like) with a password (e.g., 4312) and biometric information (e.g., fingerprint information, iris information, or the like) that are stored in the authentication information storage unit 230 (S144).

Figure 7:
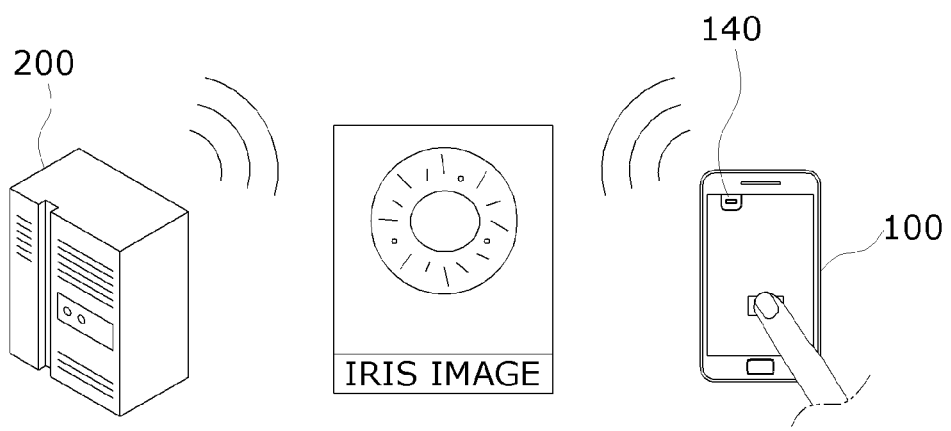
FIG. 7 is a diagram showing an example of imaging an iris of a user and transmitting the iris image to a user authentication server according to an embodiment of the present invention.

FIG. 7 is a diagram showing an example of imaging an iris of a user and transmitting the iris image to a user authentication server 200 according to an embodiment of the present invention.

As shown in FIG. 7, when biometric information is iris information, a variable keypad 110 acquires an input of an iris input indication button from a user.

A control unit 130 controls a camera unit 140 to image an iris of a user in front.

The camera unit 140 images an iris of a user according to an instruction of the control unit 130. The camera unit 140 includes a biometric identification module. When an iris is imaged, the biometric identification module checks whether a pupil is enlarged or reduced depending on incident light in order to determine whether the iris is an iris of a living person. Accordingly, it is possible to additionally improve security because it is fundamentally impossible to perform iris recognition on an eyeball of a dead person.

The control unit 130 transmits the iris image to the user authentication server 200.

A process in which the user authentication server 200 perform user authentication on the basis of the iris image received from the mobile terminal 100 will be described below.

The authentication unit 220 of the user authentication server 200 extracts an identification feature from the iris image received from the mobile terminal 100.

The user authentication server 200 measures similarity by comparing the extracted identification feature with an identification feature stored in the authentication information storage unit 230 and determines that the iris is the same as that stored in the authentication information storage unit 230 when the measured similarity is greater than or equal to a predetermined threshold value (e.g., 80%).

A human iris is characterized by the fact that it is completely formed after 18 months of ages and does not change during a lifetime. Also, various types of people live in the world, but there are no people having the same iris pattern.

Due to such unique characteristics of the irises, biometric recognition technology has higher security. Iris recognition technology separates an area of an iris and an area of a sclera with respect to a black pupil and then scans a pattern of the iris when an eye is scanned.

An iris with about 266 measurable identification features is more complex and delicate than a fingerprint with about 40 identification features.

Figure 8:
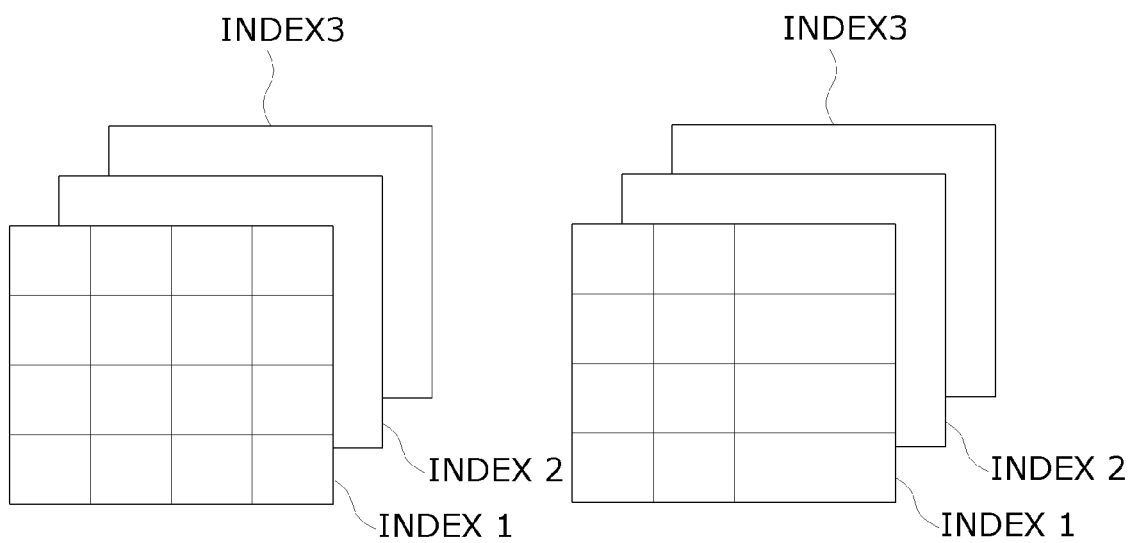
FIG. 8 is a diagram showing an identifier corresponding to a variable keypad that is stored at an authentication server and a terminal according to an embodiment of the present invention.

FIG. 8 is a diagram showing an example of performing primary authentication through an identifier corresponding to a variable keypad according to an embodiment of the present invention. An identifier corresponding to a variable keypad that is stored in an authentication server at the left side of FIG. 8, and an identifier corresponding to a variable keypad that is stored in a terminal is shown at the right side of FIG. 8.

As shown in FIG. 8, the authentication unit 220 generates a plurality of variable keypads and generates identifiers (indices) corresponding to the variable keypads. That is, when the user authentication server 200 generates variable keypads, the user authentication server 200 generates identifiers (index 1, index 2, and index 3) corresponding to variable keypad 1, variable keypad 2, and variable keypad 3 and provides variable keypad 1, variable keypad 2, and variable keypad 3 and their identifiers (index 1, index 2, and index 3) to the mobile terminal 100 in advance.

In detail, every time a variable keypad is generated, the authentication unit 220 stores an identifier corresponding to the generated variable keypad in the authentication information storage unit 230.

For example, when the variable keypad has number 1, an identifier corresponding to the variable keypad is index 1. The authentication unit 220 stores the identifier in the authentication information storage unit 230 and shares the identifier with a mobile terminal in advance.

When an authentication request is received, the authentication unit 220 selects one of the stored identifiers and provides the selected identifier to the mobile terminal 100. The mobile terminal 100 selects a variable keypad to be used for authentication from among variable keypads that are provided in advance on the basis of the received identifier and displays the selected variable keypad on a screen thereof.

The authentication unit 220 perform secondary authentication by comparing position information of password keys, input order thereof, position information of biometric authentication key, and biometric information of a member that are received from the mobile terminal 100 with position information of password keys, input order thereof, position information of biometric authentication key, and biometric information of a member that are stored in the authentication information storage unit 230.

According to this embodiment, it is possible to further improve security because only an identifier instead of an arrangement structure of a variable keypad is transmitted to a mobile terminal.

According to the present invention, a password itself that is input through a variable keypad is not transmitted to a user authentication server, but position information of the password corresponding to order in which the password is input by a user is transmitted. Accordingly, it is possible to improve security because a hacker cannot become aware of a password even when the hacker intercepts position information of secret information that is being transmitted from a terminal to a server.

Also, compared to the related art in which four digits of a password are just input and changed in position, it is possible to further improve security because user authentication is performed through a password and biometric information.

Also, it is possible to reduce the amount of data that is transmitted and also increase user convenience by transmitting only some security information from a mobile terminal to a user authentication server.

Figure 9:
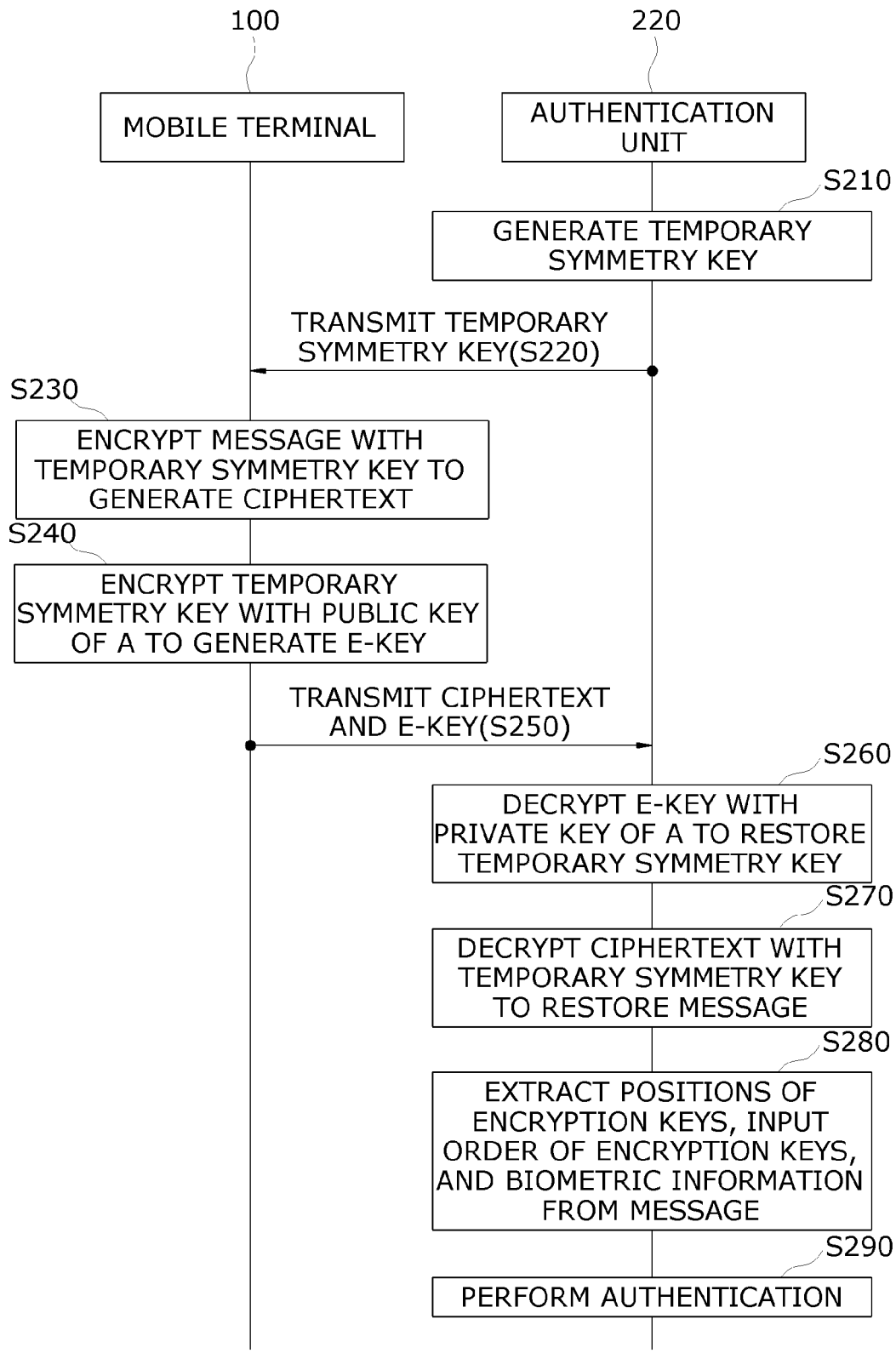
FIG. 9 is a sequence diagram showing an example of encrypting and decrypting a temporary symmetry key, a public key of a user, and a private key of a user according to an embodiment of the present invention.

FIG. 9 is a sequence diagram showing an example of encrypting and decrypting a temporary symmetry key, a public key of a user, and a private key of a user according to an embodiment of the present invention.

As shown in FIG. 9, the authentication unit 220 generates a temporary symmetry key (210) and transmits the generated temporary symmetry key to the mobile terminal 100 (S220).

The mobile terminal 100 encrypts a message with the temporary symmetry key received from the authentication unit 220 and generates ciphertext (S230).

Subsequently, the mobile terminal 100 encrypts the temporary symmetry key with a public key of user A to generate E-KEY (S240) and transmits the ciphertext and the E-KEY to the authentication unit 220 (S250).

The authentication unit 220 decrypts the E-KEY received from the mobile terminal 100 with a private key of user A to restore the temporary symmetry key (S260) and decrypts the ciphertext with the temporary symmetry key to restore the message (S270).

Subsequently, the authentication unit 220 extracts positions of password keys, input order of the password keys, and biometric information from the restored message and performs user authentication by comparing the extracted information with prestored authentication information.

According to another embodiment of the present invention, the user authentication may be performed with only the biometric information.

Figure 10:
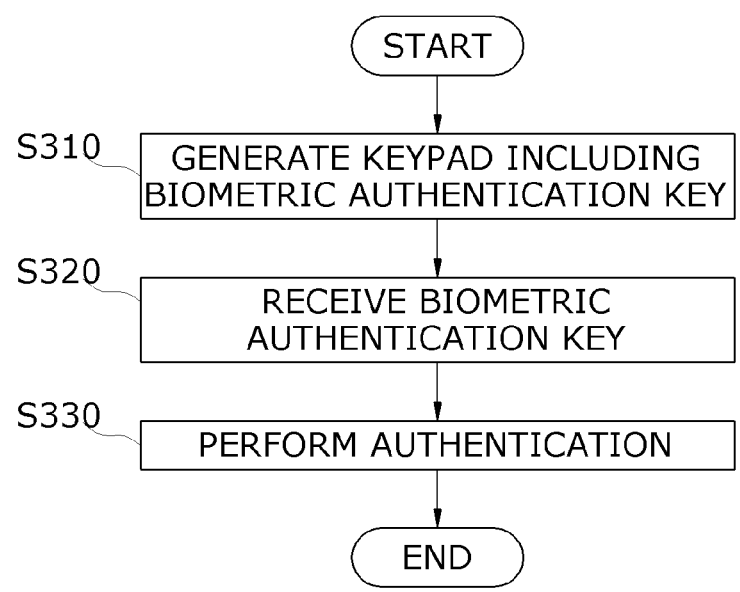
FIG. 10 is a flowchart showing a biometric-information-based user authentication method according to an embodiment of the present invention.

FIG. 10 is a flowchart showing a biometric-information-based user authentication method according to an embodiment of the present invention.

Referring to FIG. 10, the method includes generating a variable keypad including a biometric authentication key (S310). In this case, a position of the biometric authentication key is changed every time the variable keypad is generated. In detail, the variable keypad generation unit 210 generates a variable keypad such that a position of an iris input button or fingerprint input button is changed every time the variable keypad is generated.

Subsequently, the method includes transmitting the generated variable keypad to the mobile terminal and receiving at least one piece of biometric information input by a member from the mobile terminal 100 (S320).

For example, when a member presses the iris input button and the fingerprint input button through the variable keypad of the mobile terminal 100, a position of the iris input button, a position of the fingerprint input button, iris information, and fingerprint information are received from the mobile terminal 100.

Subsequently, the method includes performing user authentication on the basis of at least one of the received positions of the biometric authentication keys and at least one piece of the received biometric information (S330).

For example, the authentication unit performs user authentication through similarity determination by comparing position information (1.5, 2.5) of the iris input button, position information (1.5, 1.5) of the fingerprint input button, iris information, and fingerprint information with position information of the iris input button, position information of the fingerprint input button, iris information, and fingerprint information that are stored in the authentication information storage unit 230.

By using the biometric information, it is possible to improve user convenience because a user does not need to remember a password, improve security because there is no risk of leakage of a password, and also fundamentally prevent a possibility of a password being stolen by a third party on-line.

Also, from a seller's standpoint in electronic commerce, when biometric information is used, it is difficult for a customer to commit fraud or deception, and also it is possible to reduce cost and keep an account secret or the like.

Also, from a public standpoint, it is possible to facilitate detection of fraud and reduce risk of misuse or abuse of information regarding other people.

The above-described subject matter of the present invention is to be considered illustrative and not restrictive, and it should be understood that numerous other modifications and embodiments can be devised by those skilled in the art without departing from the spirit and scope of the present invention. Accordingly, the embodiments of the present invention are to be considered descriptive and not restrictive of the present invention, and do not limit the scope of the present invention. The scope of the invention should be to be construed by the appended claims, and all technical ideas within the scope of their equivalents should be construed as included in the scope of the invention.

The invention claimed is:

1. A mobile terminal capable of user authentication, the mobile terminal comprising:
   a storage configured to store a plurality of variable keypads in association with respective corresponding identifiers, wherein positions of password keys and a biometric authentication key are different among the plurality of variable keypads;
   a controller configured to receive, based on an authentication request, an identifier of a variable keypad from a user authentication server and select the variable keypad corresponding to the received identifier from among the plurality of variable keypads stored in the storage; and
   a display configured to display information on the selected variable keypad,
   wherein the controller is further configured to transmit, to the user authentication server, position information of password keys, order in which the password keys are input, and biometric information, the password keys and the biometric information being received through the displayed variable keypad.

2. The mobile terminal of claim 1, further comprising a camera configured to capture an image, wherein,
   in response to receiving an input for entering the iris information through the variable keypad, the controller is further configured to control the camera to capture an image of an iris of a user and transmit the captured image to the user authentication server as the biometric information.

3. The mobile terminal of claim 1, wherein the controller is further configured to receive the identifier of the variable keypad without receiving an arrangement structure of the variable keypad.

* * * * *